No. 867,427. PATENTED OCT. 1, 1907.
I. SHIVELY & J. HUBER.
CEMENT GATE MOLD.
APPLICATION FILED JUNE 3, 1907.
2 SHEETS—SHEET 1.
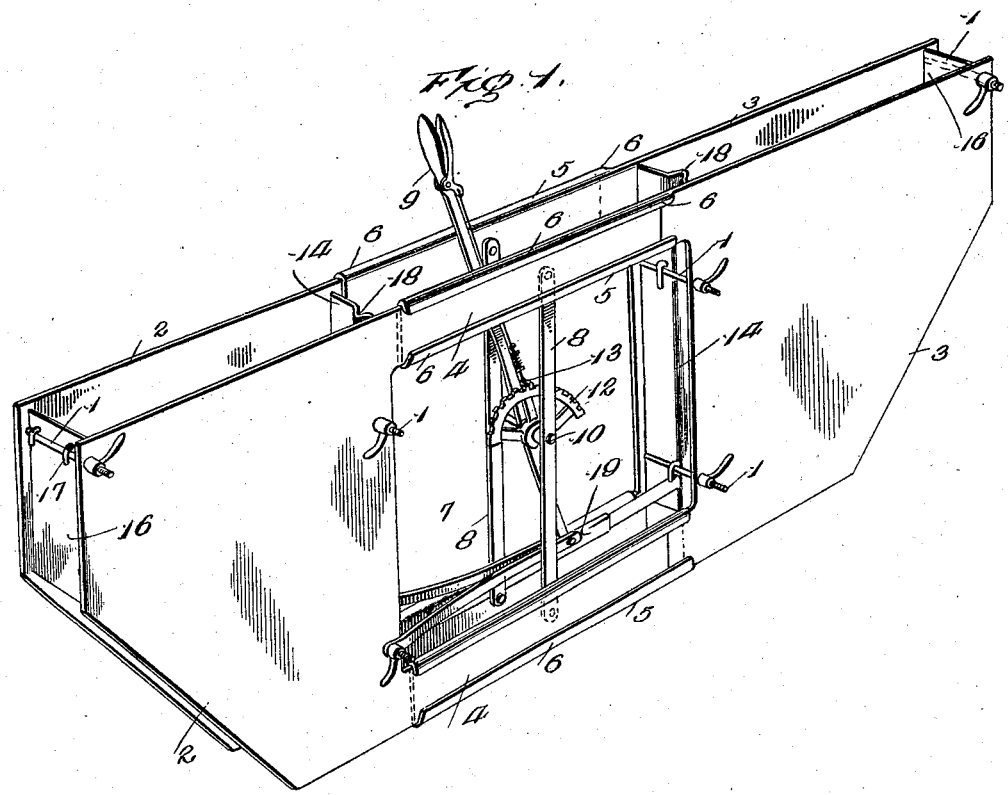
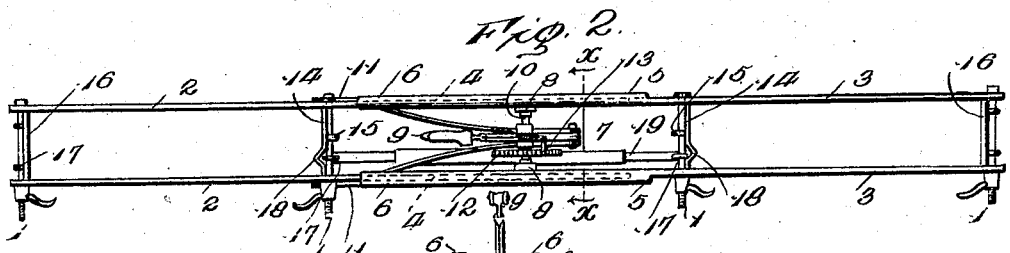
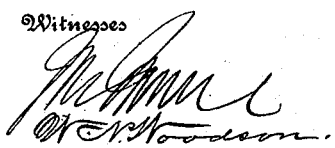
Inventors
Ira Shively
Jay Huber

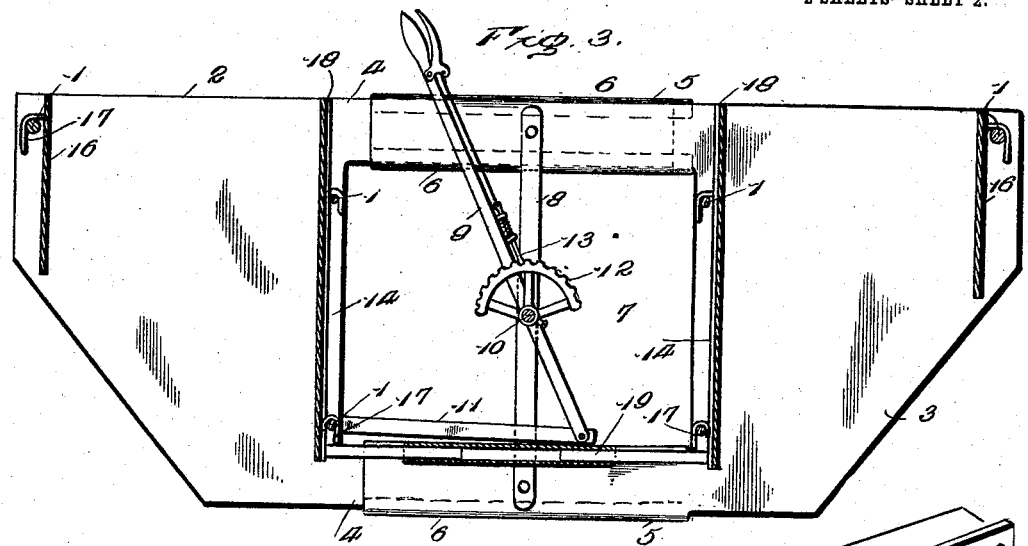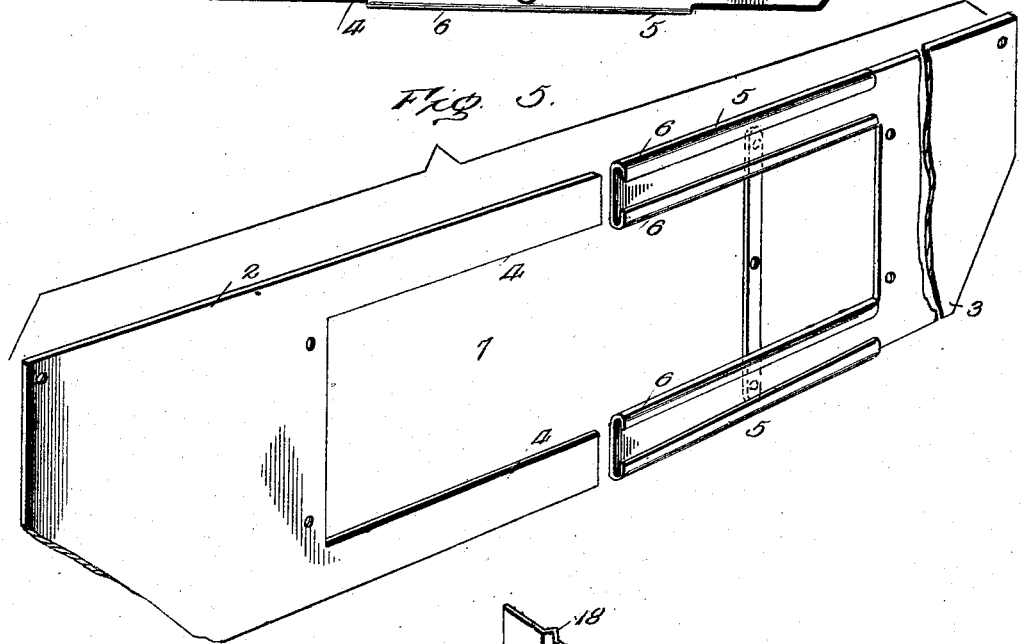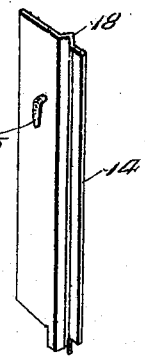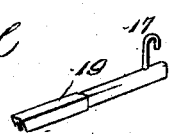

UNITED STATES PATENT OFFICE.

IRA SHIVELY AND JAY HUBER, OF DEXTER, TERRITORY OF NEW MEXICO.

CEMENT-GATE MOLD.

No. 867,427.         Specification of Letters Patent.         Patented Oct. 1, 1907.

Application filed June 3, 1907. Serial No. 377,014.

*To all whom it may concern:*

Be it known that we, IRA SHIVELY and JAY HUBER, citizens of the United States, residing at Dexter, in the county of Chaves, New Mexico Territory, have invented certain new and useful Improvements in Cement-Gate Molds, of which the following is a specification.

This invention provides a novel form of mold for constructing cement gates to be used in connection with irrigating systems and plants, the purpose being to provide a material which may be adjusted according to the width of the outlet and which may be set up and readily taken apart as may be required, thereby enabling the mold to be easily handled and to be compactly stored when not required for immediate application.

For a full description of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a mold for constructing cement goods embodying the invention. Fig. 2 is a top plan view. Fig. 3 is a front view, the near side being removed. Fig. 4 is a transverse section on the line *x—x* of Fig. 2. Fig. 5 is a detail perspective view of a side piece. Fig. 6 is a detail perspective view of the extensible bar for forming the groove in the lower side of the gate opening.

Corresponding and like parts are referred to in the following description and indicated in all the views of the drawings by the same reference characters.

The mold is preferably constructed of sheet metal and comprises similar side pieces which are extensible to admit of adjusting the mold within certain limits to the size of the opening or water outlet to be provided with a cement gate. The side pieces of the mold are spaced apart a suitable distance depending upon the required thickness of the gate. Inasmuch as it is desirable to have the gate thicker at the bottom in order to withstand the pressure, the side pieces of the mold are downwardly flared with the result that the space between them is widened from top to bottom.
A series of bolts 1 connect the side pieces of the mold and are passed through corresponding openings formed therein, and the threaded ends of the bolts are fitted with end nuts to obviate the necessity of providing a wrench or other implement to turn said nuts when it is required to tighten or loosen the same.

The side pieces as stated, are of similar formation, each comprising complemental sections 2 and 3 from the inner ends of which project strips 4 and 5. These strips have a sliding connection to admit of the sections 2 and 3 being separated or moved closer together. Suitable guides are provided between the strips 4 and 5 to hold them in place and insure proper movement of the sections or parts when adjusting the mold to the particular outlet. One of the strips, as 5, is provided at its upper and lower edges with flanges 6 to embrace the corresponding edges of the mating strip 4. It is to be understood that the strips 4 and 5 above and below the opening 7 are of like formation. Bars 8 are vertically arranged and are connected at their ends to the upper and lower strips 5, which strips are relatively located upon the inner side of the mold space.

The sections or parts of the mold are adapted to be moved by means of a lever 9 which is fulcrumed at 10 to the upright bars 8, links 11 connecting the lower end of the lever 9 to the sections or parts provided with the strips 4. It will thus be understood that the lever 9 is fulcrumed upon a support having connection with one of the sections and is connected by links to the other section, and as a result movement of the lever in one direction starts or lengthens the mold, whereas movement in the opposite direction shortens or contracts the mold. To hold the parts in an adjusted position, the operating lever 9 is provided with a latch 13 which is adapted to coöperate with the teeth of a curved bar 12 secured to the upright bars 8.

The space between the side pieces of the mold is closed at its bottom and ends by the bottom and sides of the outlet through which the water escapes from the lake or pond into the furrows or irrigating channels. The space between the side pieces of the mold bordering upon the gate opening 7 is closed by means of side pieces 14 and 16, the same being supported against the pressure of the cement by means of the upper and lower bolts connecting the inner edge portions of corresponding sections of the side pieces. A hook 15 provided near the upper end of each side piece 14 engages over the upper bolt to hold the side piece in place when filling the mold with cement or like material. The side pieces 16 are located at the upper outer ends of the side pieces of the mold and are suspended by means of hooks 17 from the bolts or fastenings 1 at the upper outer corners of the mold. The side pieces 14 have ribs 18, the same being pressed outward therefrom and adapted to provide grooves in the end walls of the cement gate bordering upon the opening 7, which is adapted to be closed by the usual wooden gate.

In order to insure the formation of a close joint at the bottom of the gate opening 7, a groove is formed in the upper edge of the cement gate, and this groove is provided by means of a bar 19 which is extensible to correspond to the adjustability of the gate, said bar being composed of telescoping sections. The bar 19 is adapted to be embedded in the cement bordering upon the lower side of the gate opening 7.

Having thus described the invention, what is claimed as new is:

1. A mold for constructing cement gates for irrigating systems, said mold comprising spaced side pieces, and each side piece comprising adjustable sections having a gate opening formed between their inner ends.

2. A mold for constructing cement gates for irrigating systems, said mold comprising spaced side pieces, and each side piece comprising adjustable sections having a gate opening formed between their inner ends, complemental sections having projected strips located above and below the gate opening and held and directed in their movements by suitable guides.

3. A mold for constructing cement gates for irrigating systems, said mold comprising spaced side pieces, and each side piece comprising adjustable sections having a gate opening formed between their inner ends, complemental sections having projected strips located above and below the gate opening and held and directed in their movements by suitable guides, an operating lever having positive connection with corresponding sections, and a link connecting said operating lever with the opposite sections.

4. A mold for constructing cement gates for irrigating systems, said mold comprising spaced side pieces having a gate opening and having interposed side pieces bordering upon the gate opening, and a bar adapted to be located below said gate opening and between the interposed side pieces to form a groove in the cement gate at a point below the gate opening formed therein.

5. A cement mold for constructing gates of concrete, said mold comprising adjustable sections, and a bar located between the side pieces and sections of the mold and composed of adjustable parts and adapted to form a groove in the cement or concrete gate at a point below the gate opening.

6. A mold for constructing cement gates for irrigating systems, said mold comprising side pieces spaced apart, each side piece embodying complemental sections having inwardly extended strips, the strips of one section having flanges to embrace longitudinal edge portions of the strips of the other section, bars connecting the inner strips, a lever fulcrumed to said bars, links connecting said lever with the opposite sections of the side pieces, and means for holding the lever in an adjusted position.

7. A mold for constructing cement gates for irrigating systems, the same comprising side pieces having a gate opening between their ends and spaced apart, fastenings connecting said side pieces and located near the outer edges thereof and the edges bordering upon the gate opening, and side pieces for closing the space formed between the side pieces of the mold and provided with hooks to engage over the said fastenings for holding the inclosing side pieces in place.

In testimony whereof we affix our signature in presence of two witnesses.

IRA SHIVELY. [L. S.]
JAY HUBER. [L. S.]

Witnesses:
FRANCES BAILEY,
W. S. DAY.